(12) United States Patent
DeStories et al.

(10) Patent No.: US 9,618,069 B2
(45) Date of Patent: Apr. 11, 2017

(54) ADJUSTABLE COMPRESSION, ADJUSTABLE TENSION ROD INDICATOR, AND ADJUSTABLE EXTENSION ROD

(71) Applicant: The Boeing Company, Chicago, IL (US)

(72) Inventors: Jason Gerald DeStories, Mesa, AZ (US); Mark Andrew Schmier, II, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 379 days.

(21) Appl. No.: 13/899,005

(22) Filed: May 21, 2013

(65) Prior Publication Data

US 2014/0346793 A1 Nov. 27, 2014

(51) Int. Cl.
 B25B 5/12 (2006.01)
 F16F 1/00 (2006.01)
 B25B 5/04 (2006.01)
 B25B 5/16 (2006.01)
 B25J 15/00 (2006.01)

(52) U.S. Cl.
 CPC ............... *F16F 1/00* (2013.01); *B25B 5/04* (2013.01); *B25B 5/12* (2013.01); *B25B 5/16* (2013.01); *B25J 15/0028* (2013.01)

(58) Field of Classification Search
 CPC ............ F16F 1/00; F16F 2230/0017; F16F 2230/0035; F16F 2236/06; B25B 5/04; B25B 5/12; B25B 5/16; B25J 15/0028
 See application file for complete search history.

(56) References Cited

U.S. PATENT DOCUMENTS

| 2,586,245 | A |  | 2/1952 | McRae |
| 2,920,665 | A | * | 1/1960 | Hutson ........................... 269/88 |
| 4,964,479 | A |  | 10/1990 | Sumida |
| 5,358,068 | A |  | 10/1994 | Whittmer |
| 7,219,951 | B2 | * | 5/2007 | Rasmussen ................... 296/156 |
| 7,237,977 | B2 | * | 7/2007 | Kay ................................ 403/43 |
| 8,292,274 | B2 |  | 10/2012 | Adoline et al. |
| 8,403,115 | B2 |  | 3/2013 | Gartner et al. |
| 2007/0267894 | A1 |  | 11/2007 | Van Den Brink et al. |
| 2009/0056476 | A1 | * | 3/2009 | Glass ....................... 73/862.391 |
| 2011/0024962 | A1 | * | 2/2011 | Zhang ........................... 269/107 |

FOREIGN PATENT DOCUMENTS

| EP | 0134819 | A1 | 3/1985 |
| FR | 2982516 | A1 | 5/2013 |
| GB | 2184060 | A | 6/1987 |

OTHER PUBLICATIONS

Extended European Search Report, dated Jul. 22, 2015, regarding Application No. EP14167560.3, 9 pages.

* cited by examiner

*Primary Examiner* — Bradley King
(74) *Attorney, Agent, or Firm* — Yee & Associates, P.C.

(57) ABSTRACT

A biasing device that returns to a rest position when the biasing device is subjected to one of a first compression by a first object and a first tension by a second object in which the first tension causes a second compression of a third object, in which the first compression causes a second tension of the third object, in which elongation of the rod assembly simultaneously occurs with the first tension and the second compression, and in which elongation of the rod assembly simultaneously occurs with the second tension and the first compression.

22 Claims, 17 Drawing Sheets

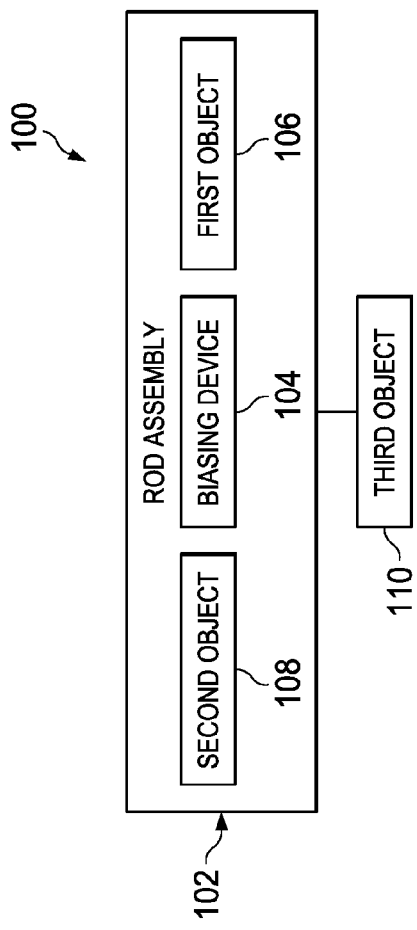
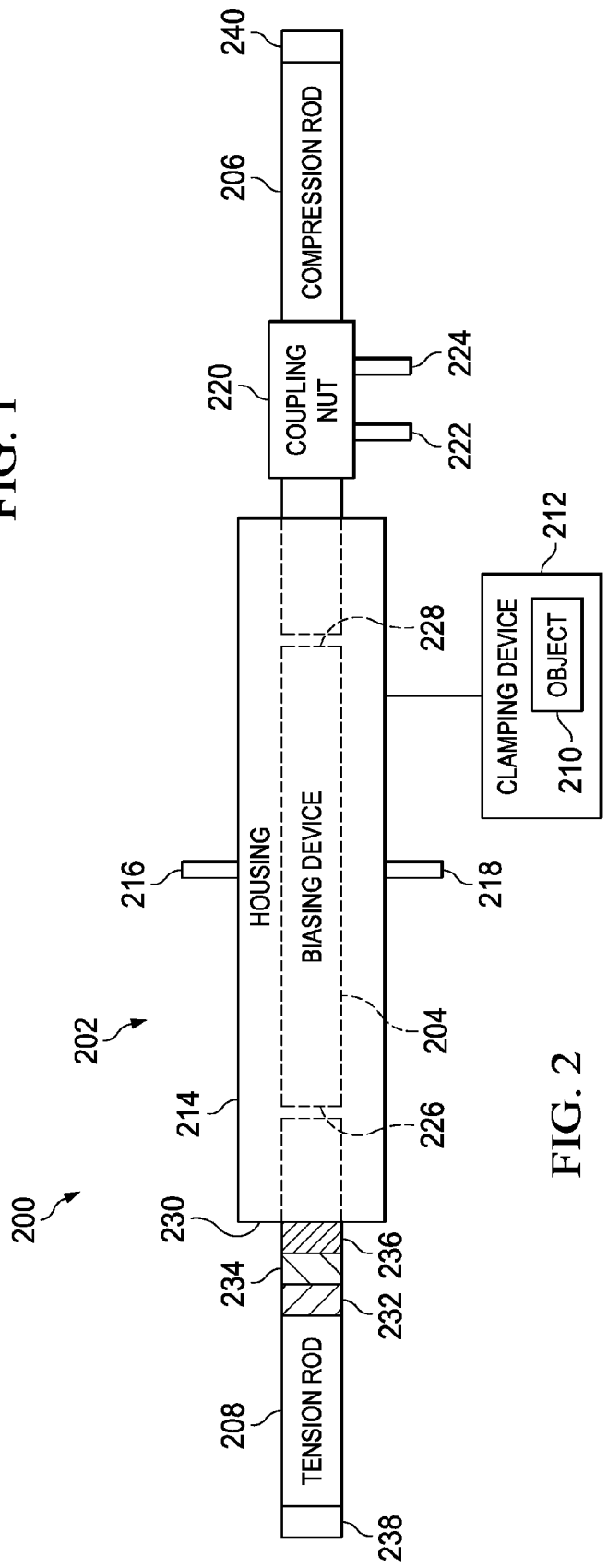

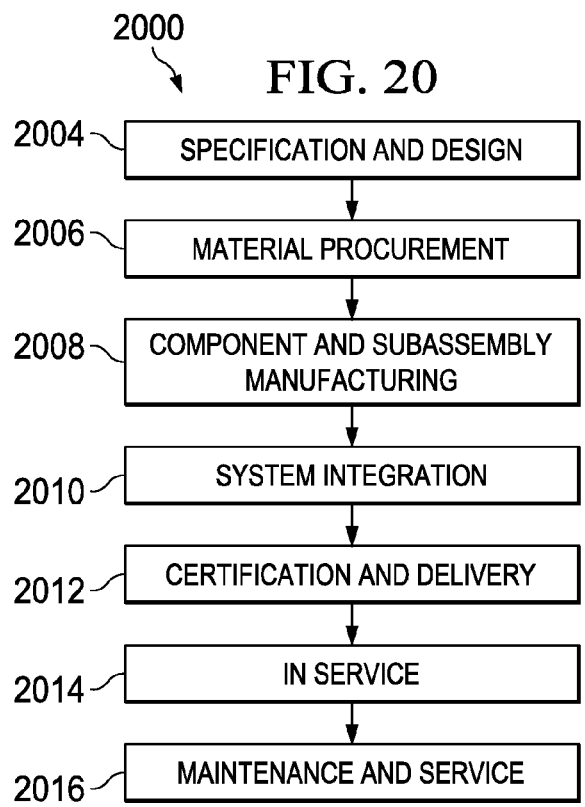
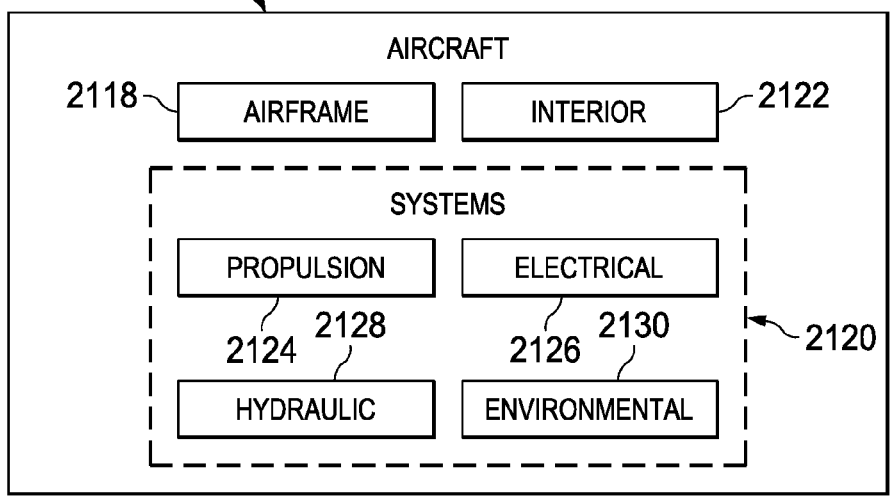

ADJUSTABLE COMPRESSION, ADJUSTABLE TENSION ROD INDICATOR, AND ADJUSTABLE EXTENSION ROD

BACKGROUND INFORMATION

1. Field

The present disclosure relates generally to the controlling of an object through the use of adjustable compression and tension based on indications of compression and tension. In particular, the present disclosure relates to a system and method for employing an object configured to apply a biasing force, the object being compressed and extended by rods whose position may be fixed, in conjunction with a device that may clamp and hold the captured object with a known pressure.

2. Background

Compression rods, tension rods, and extension rods are used for many purposes, including retaining and stabilizing an object. Currently known devices include shock absorbers, spring loaded clamping devices, and coupling nut devices. Shock absorbers control an amount of compression to known objects while reducing extension recovery time. Shock absorbers smooth out and damp shock impulse as well as dissipate kinetic energy. Spring loaded clamping devices support the holding of an object in place by exerting over forces or under forces or spring actuated forces.

Coupling nut devices are used to create extended rod assemblies from shorter lengths of rods. Coupling nut devices may use a threaded fastener to join two male threads, commonly known as externally threaded rods. By drawing two threaded male rods closer together or driving them farther apart, an overall length of the combined two rods and coupling nut device may be fixed and known. More than one coupling nut device may be used with a plurality of threaded male rods, to create a rod assembly of more extended length.

Tension rods have a variety of applications wherein ends of a rod are forced outward to press against fixed surfaces. Curtain rods containing springs that install into window frames or shower stalls without a need for fixed hanging hardware are examples of domestic uses of tension rods.

Load cells and limit switches are used in applying compression and tension in industrial applications. Load cells are transducers that convert force into electrical signals. Limit switches are operated by the motion of a machine part or presence of an object. They are used for control of a machine, as safety interlocks, or to count objects passing a point. Standardized limit switches are industrial control components that may be operated by the motion of the operating lever. Gas cylinders, gas struts, and various hydraulic devices are also used in applications requiring compression and tension.

While these devices provide examples of applications that apply compression and tension, none of these applications are able to steadily apply fixed and known compression or tension, particularly in connection with grasping and maintaining hold of an object that may be fragile, while rigidity of the device is concurrently maintained. Accordingly, there is a need for a method and apparatus which takes into account one or more of the issues discussed above as well as possibly other issues.

SUMMARY

The illustrative embodiments provide for a rod assembly. The rod assembly comprises a biasing device that returns to a rest position when the biasing device is subjected to one of a first compression by a first object and a first tension by a second object in which the first tension causes a second compression of a third object, in which the first compression causes a second tension of the third object, in which elongation of the rod assembly simultaneously occurs with the first tension and the second compression, and in which elongation of the rod assembly simultaneously occurs with the second tension and the first compression. The illustrative embodiments also provide for an apparatus. The apparatus comprises an apparatus with adjustable compression, tension, and extension. The apparatus comprises a housing component comprising a hollow tube, a compression rod configured to insert partially inside a first end of the housing component, and a coupling nut attached to the compression rod, the coupling nut configured to affix a position of the compression rod relative to the housing component. The apparatus also comprises a tension rod configured for partial insertion inside a second end of the housing component and a biasing device configured for placement inside the housing component between and attached to the tension rod and the compression rod. Adjustments to positioning of at least one of the compression rod and the tension rod relative to the housing component alter compression and tension of the biasing device and cause the apparatus to respectively one of push and pull devices contacting the apparatus.

The illustrative embodiments also provide for a method for controlling an amount of force required to retain and release at least one object through clamping and holding. The method comprises attaching a rod assembly to a clamping device, the clamping device comprising jaws for applying one of a first tension and a first compression to an object, the clamping device further comprising a handle in which pulling the handle causes the jaws to apply the first compression to the object, and in which pushing the handle causes the jaws to apply the first tension to the object. The method also comprises turning a coupling nut on a first shaft of the rod assembly to set a second tension of a biasing device in the rod assembly until the second tension is exhibited on markers displayed on a second shaft of the rod assembly, the second tension causing a second compression against the object when the handle is pulled. The method also comprises turning the first shaft in the rod assembly to set a third compression exerted by the rod assembly, the third compression exerted by the rod assembly causing a third tension against the object when the handle is pushed in which turning the coupling nut additionally adjusts length of the rod assembly simultaneous with setting the second tension and the second compression and simultaneous with setting the third compression and the third tension.

The illustrative embodiments also provide for a method comprising simultaneously applying, using only a single rod assembly, compression, tension, and elongation of the single rod assembly to a tool connected to the single rod assembly.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is a block diagram of a rod assembly in accordance with an illustrative embodiment;

FIG. 2 is a block diagram of a rod assembly and a clamping device in accordance with an illustrative embodiment.

FIG. 20 is a flowchart of a method of manufacturing a commercial aircraft.

FIG. 21 is a block diagram of a commercial aircraft.

DETAILED DESCRIPTION

Figure 3:
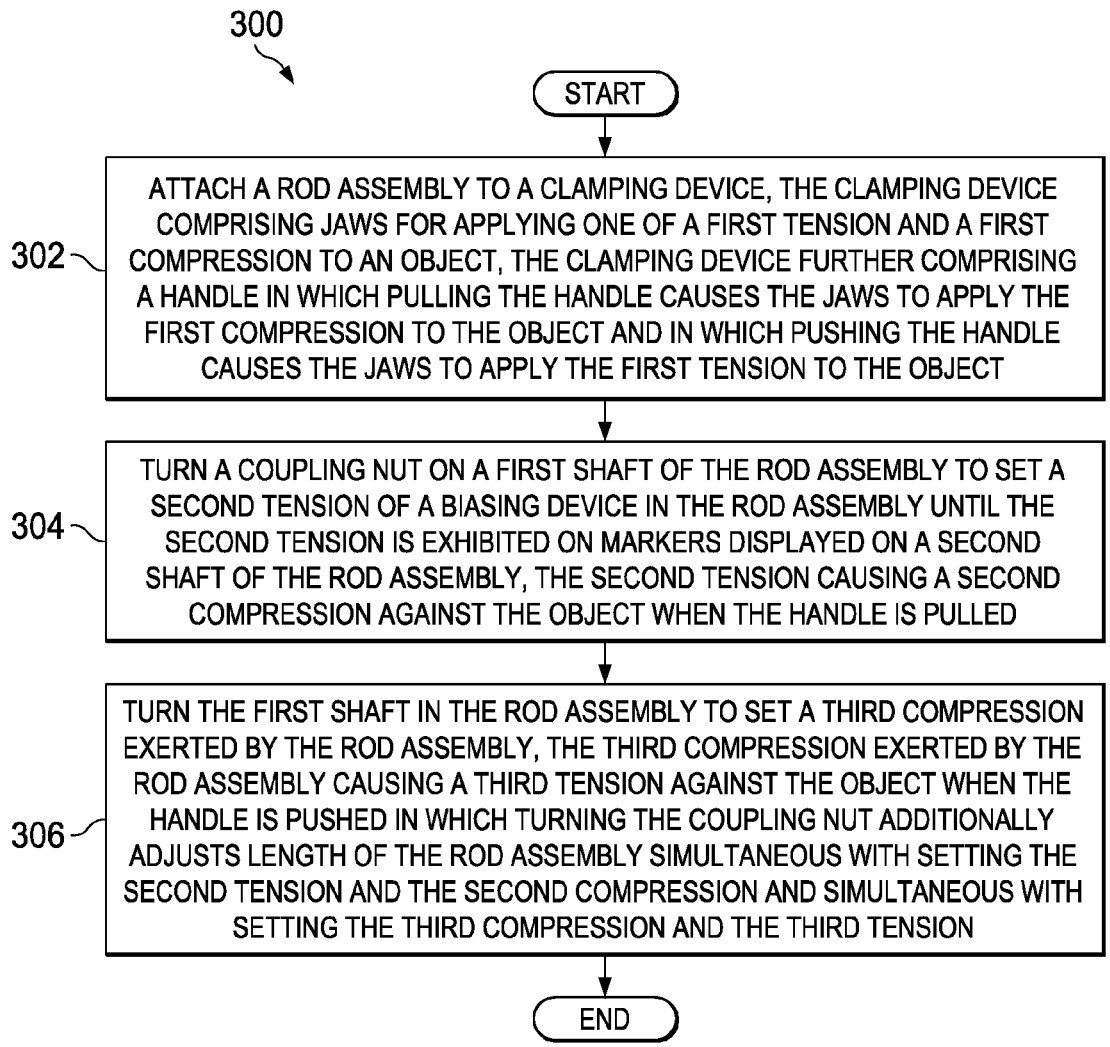
FIG. 3 is a flowchart of a method for controlling an amount of force required to retain and release at least one object through clamping and holding in accordance with an illustrative embodiment.

The illustrative embodiments recognize and take into account the issues described above, with respect to providing adjustable and fixable compression and tension for a rod assembly with adjustable length. Thus, the illustrative embodiments relate to systems and methods wherein one of tension and compression by the system provided herein may be affixed and held constant. The system provides methods for controlling an amount of force required to retain and release an object or objects through clamping and holding. Controlling such required amount of force may be accomplished through using an adjustable tension indication portion of the rod assembly.

The illustrative embodiments also provide for controlling an amount of force required to retain or release an object or objects through a portion of the rod assembly that applies adjustable compression. The system also allows setting the desired extension of the rod assembly.

The illustrative embodiments recognize that fragile objects may need to be grasped, clamped, lifted, and in some cases moved. Some objects may, for example, contain sensitive electronic parts. Effectively and safely grasping such objects may require applying an amount of grasping force that is adequate to take and maintain hold of such objects without risking dropping the objects, while at the same time not applying excessive grasping force that may damage the objects.

The illustrative embodiments contemplate that the rod assembly of the present disclosure may include a tubular housing that contains a biasing device with an elastic property. In an embodiment, the biasing device may be a spring. The spring may be both compressible and stretchable. A first rod, or compression rod, that may be externally threaded, may screw into a threaded end of the tubular housing and attach to one end of the spring.

By adjusting an amount of the compression rod that is screwed into the tubular housing, and therefore pressing against the spring, a level of compression may be set. A second rod, or tension rod, that may not be threaded may slide into an opposite or non-threaded end of the tubular housing and attach to the opposite end of the spring. The spring may have a known spring constant.

The tension rod may be calibrated to the spring constant. When the tension rod, which is partially inside the tubular housing and attached to the spring, is pulled from the tubular housing, stripes or other indicia on the tension rod that are calibrated to the spring constant of the spring may be visible. These indicia may indicate the amount of tension or pulling force on the entire device.

Screws or similar components may be placed in the tubular housing, a compression rod, the tension rod, or the coupling nut. These components may promote the device to remain rigid and maintain a desired level of compression or tension depending respectively on whether the spring has been pushed or pulled.

The illustrative embodiments further provide for the threaded end of the tubular housing, the coupling nut, and the threaded compression rod to be used together to adjust the overall length of the rod assembly. Compression is controlled by back tension on the spring by the compression rod in the tubular housing. In other embodiments, tubular housing, the compression rod, and the coupling nut might not be threaded and instead may bind to each other using components and methods other than threading.

The illustrative embodiments further contemplate that the rod assembly may be used in conjunction with a clamping mechanism or device. Such a device clamps and maintains hold of the object of interest. The rod assembly may be attached to the clamping device, such that the amount of tension or compression provided by the rod assembly directly bears upon an amount of pressure that the clamping device places against the object.

Ends of the compression rod and the tension rod may be fitted into components of a clamping device associated with opening and closing the device on an object. Depending on a necessary level of pressure to be applied to the object, a compression or tension may be set for the rod assembly. The rod assembly then may attach to handles or other components of the clamping device that control closing and opening jaws that grasp and release the object.

The illustrative embodiments further recognize that while the rod assembly of the present disclosure may be used in applications for applying pressure against an object that is being grasped and released, the rod assembly may be used in other applications. Such applications may call for the control of an amount of force wherein grasping or clamping is not involved.

Attention is now turned to the figures. FIG. 1 is a block diagram of a rod assembly in accordance with an illustrative embodiment. System 100 includes rod assembly 102. Rod assembly 102 includes biasing device 104, first object 106, and second object 108. Biasing device 104 returns to a rest position when biasing device 104 is subjected to a first compression by first object 106. Biasing device 104 also returns to rest position when biasing device 104 is subjected to a first tension by second object 108.

System 100 also includes third object 110 that is not a component of rod assembly 102. Third object 110 is subjected to forces created in part by rod assembly 102.

First tension causes a second compression of third object 110. First compression causes a second tension of third object 110. Elongation of rod assembly 102 simultaneously occurs with first tension and second compression. Elongation of rod assembly 102 simultaneously occurs with second tension and first compression.

FIG. 2 is a block diagram of system 200 of a rod assembly 202 depicted in accordance with an illustrative embodiment. System 200 may include biasing device 204. In an embodiment, biasing device 204 may be a spring. While the term "biasing device 204" is used herein to indicate an object that both compresses and stretches, in other embodiments, biasing device 204 may not be a spring and may instead be another object with biasing force properties that urge biasing device 204 back to a rest position once biasing device 204 is one of stretched and compressed. Biasing device 204 may have components at each end permitting biasing device 204 to be grasped. Biasing device 204 may be composed of a metallic material, but may be another material such as a non-metallic material. Biasing device 204, if a spring, may have a known spring constant.

System 200 also includes compression rod 206 and tension rod 208 that attach to biasing device 204 at opposite ends of biasing device 204. Compression rod 206 pushes upon or applies compression to biasing device 204. Tension rod 208 pulls or applies tension to biasing device 204.

System 200 also includes clamping device 212 that may use rod assembly 202 to implement adjustments in applying pressure. System 200 also includes object 210 which is grasped and released by clamping device 212. Amounts of compression and tension applied by clamping device 212 against object 210 are affected by adjustments to components of rod assembly 202 when rod assembly 202 is being used in conjunction with clamping device 212. In an embodiment, rod assembly 202 may be attached to clamping device 212 and used by clamping device 212 to implement changes in pressure against object 210.

While clamping device 212 and object 210 are depicted in FIG. 2 and are included in a discussion herein of the components of rod assembly 202, clamping device 212 and object 210 are optional components herein and are provided purely for discussion purposes. Clamping device 212 and object 210 are provided in an illustrative embodiment purely to elucidate capabilities of rod assembly 202. In other illustrative embodiments, rod assembly 202 may be used in manners entirely unrelated to clamping and releasing an object. Rod assembly 202 may apply compression, tension, and elongation in applications and embodiments that do not involve clamping device 212, object 210, and the actions of applying and releasing pressure on an object.

System 200 also includes housing 214 that is a component of rod assembly 202. Housing 214 may be a hollow, tubular structure that may be internally threaded at one or more ends. In an illustrative embodiment, housing 214 is made of a metallic material. Housing 214 may, in other embodiments, be made of non-metallic material, for example, a plastic or a composite material. System 200 also may include screw 216 and screw 218 that screw into housing 214 and affix components inside housing 214 into place to maintain rigidity of rod assembly 202.

Compression rod 206 may be externally threaded and may screw partially into an internally threaded end of housing 214. Compression rod 206 may attach to biasing device 204 inside housing 214. Compression rod 206 may push or pull biasing device 204 to respectively compress or stretch biasing device 204. While not depicted in FIG. 2, compression rod 206 may include a mechanism for attaching to biasing device 204, thereby facilitating the pulling or pushing of biasing device 204.

System 200 also may include coupling nut 220 that may be internally threaded and may screw onto compression rod 206. Coupling nut 220 may be used to assist in turning compression rod 206, while compression rod 206 screws in or out of housing 214. Turning compression rod 206 may result in compression or tension of biasing device 204. Moving coupling nut 220 may also change the overall length of rod assembly 202. In an embodiment, compression rod 206 may include two separate, externally threaded rods joined by coupling nut 220, a configuration that may facilitate changing the overall length of rod assembly 202.

System 200 also may include pin 222 and pin 224 that insert into coupling nut 220 in a perpendicular or other manner to affix coupling nut 220 in place. When coupling nut 220 is turned to a point such that an overall length of rod assembly 202 is set, and a desired level of back tension is set on biasing device 204, it may be desirable to affix coupling nut 220 in place to maintain rigidity, length, and tension. Pin 222 and pin 224 may be inserted into holes in a side of coupling nut 220. Pin 222 and pin 224 may slide, screw, or otherwise pass through the holes until pin 222 and pin 224 make firm contact with compression rod 206 and effectively lock coupling nut 220 to compression rod 206 and thus prevent coupling nut 220 from turning. Actions of pin 222 and pin 224 may prevent changes in the overall length of rod assembly 202 as well as changes to a tension on biasing device 204. While pin 222 and pin 224 are provided herein, in other embodiments, system 200 may be only one pin or may comprise three or more pins. Other types of stops might be used. In an embodiment, a second coupling nut may screw onto compression rod 206 against coupling nut 220 to tighten against coupling nut 220.

Tension rod 208 may slide partially inside housing 214 and attach to end 226 of biasing device 204 that is opposite end 228 of biasing device 204 attached to compression rod 206. Tension rod 208 slides into end 230 of housing 214 that is not internally threaded. In an embodiment, tension rod 208 is calibrated with visible band 232, band 234, and band 236 that may vary in color or other manner of indication between levels of calibration. Band 232, band 234, and band 236 may be calibrated to a spring constant of biasing device 204.

As tension rod 208 pulls from housing 214, thus stretching biasing device 204, band 232, band 234, and band 236 may visibly indicate an increasing amount of tension on biasing device 204. In an illustrative example using FIG. 2, as tension rod 208 is pulled out from housing 214 thus applying tension to or stretching biasing device 204, band 232, band 234, and band 236 may appear in successive order. Appearance of each of band 232, band 234, and band 236 as tension rod 208 pulls out increasingly far may indicate an increasing level of tension on biasing device 204. Given a known spring constant for biasing device 204, appearance of band 232 as tension rod 208 is pulled may indicate a first level of tension on biasing device 204. Appearance of band 232 and band 234 as tension rod 208 is pulled out further may indicate a second level of tension on biasing device 204. Appearance of band 232, band 234, and band 236 as tension rod 208 is pulled out even further may indicate yet a third level of tension on biasing device 204.

The second level of tension is higher than first level of tension. The third level of tension is higher than second level of tension and first level of tension. In the event tension rod 208 is pulled sufficiently far such that all of band 232, band 234, and band 236 are visible, biasing device 204 may be stretched so far that elasticity of biasing device 204 is destroyed. In an event that biasing device 204 may be stretched so far that elasticity of biasing device 204 is nearing a point of destruction, color or other indicia of tension visible on tension rod 208 may indicate an alerted situation.

Biasing device 204 is depicted in FIG. 2 using a dotted line to indicate that biasing device 204 is inside housing 214. Portions of compression rod 206 and tension rod 208 that are inside housing 214 are also depicted using dotted lines.

FIG. 3 is a flowchart of a method for controlling an amount of force required to retain and release at least one object through clamping and holding in accordance with an illustrative embodiment. Method 300 shown in FIG. 3 may be implemented using system 100 of FIG. 1 and system 200 of FIG. 2. The process depicted in FIG. 3 may be a variation of the processes discussed in connection with FIG. 1, with FIG. 2 and with FIG. 4 through FIG. 22. Although the operations presented in FIG. 3 are described as being performed by "a process," the operations may be performed using one or more physical devices, as described elsewhere herein. In an illustrative embodiment, the "process" may be one or more human users.

Method 300 may begin as the process attaches rod assembly 202 to clamping device 212, clamping device 212 including jaws for applying one of a first compression and a first tension to object 210, clamping device 212 further including a handle in which pulling handle causes jaws to apply the first compression to object 210, and in which pushing handle causes jaws to apply the first tension to object 210 (operation 302). Jaws and handle of clamping device 212 are described in detail herein in discussion of FIG. 12 through FIG. 18.

The process may then turn coupling nut 220 on a first shaft that may be compression rod 206 of rod assembly 202 to set a second tension of biasing device 204 in rod assembly 202 until second tension is exhibited on markers that may be band 232, band 234, and band 236 displayed on a second shaft that may be tension rod 208, second tension causing a second compression against object 210 when handle is pulled (operation 304).

The process may then turn the first shaft in rod assembly 202 to set a third compression exerted by rod assembly 202, third compression exerted by rod assembly 202 causing a third tension against object 210 when handle is pushed in which turning coupling nut 220 additionally adjusts length of rod assembly 202 simultaneously with setting second tension and second compression and simultaneous with setting third compression and third tension (operation 306).

Tension rod 208 has end 238 and compression rod 206 has end 240 that are not inside housing 214 and are at far ends of rod assembly 202. Each of end 238 and end 240 may have tabs with holes or other openings that permit attachment of rod assembly 202 to other devices, including clamping device 212.

The process shown in FIG. 3 is exemplary only. The process may be varied, both in terms of the number of operations as well as in terms of what devices are used to carry out the operations. For example, different biasing devices 204 may be used in combination with different tension rods 208 depending on levels of tension desired and overall demands of a task. In addition, as noted above, compression rod 206 may comprise two separate components that are joined by coupling nut 220, an arrangement that may support greater flexibility in extending overall length of rod assembly.

Figure 4:
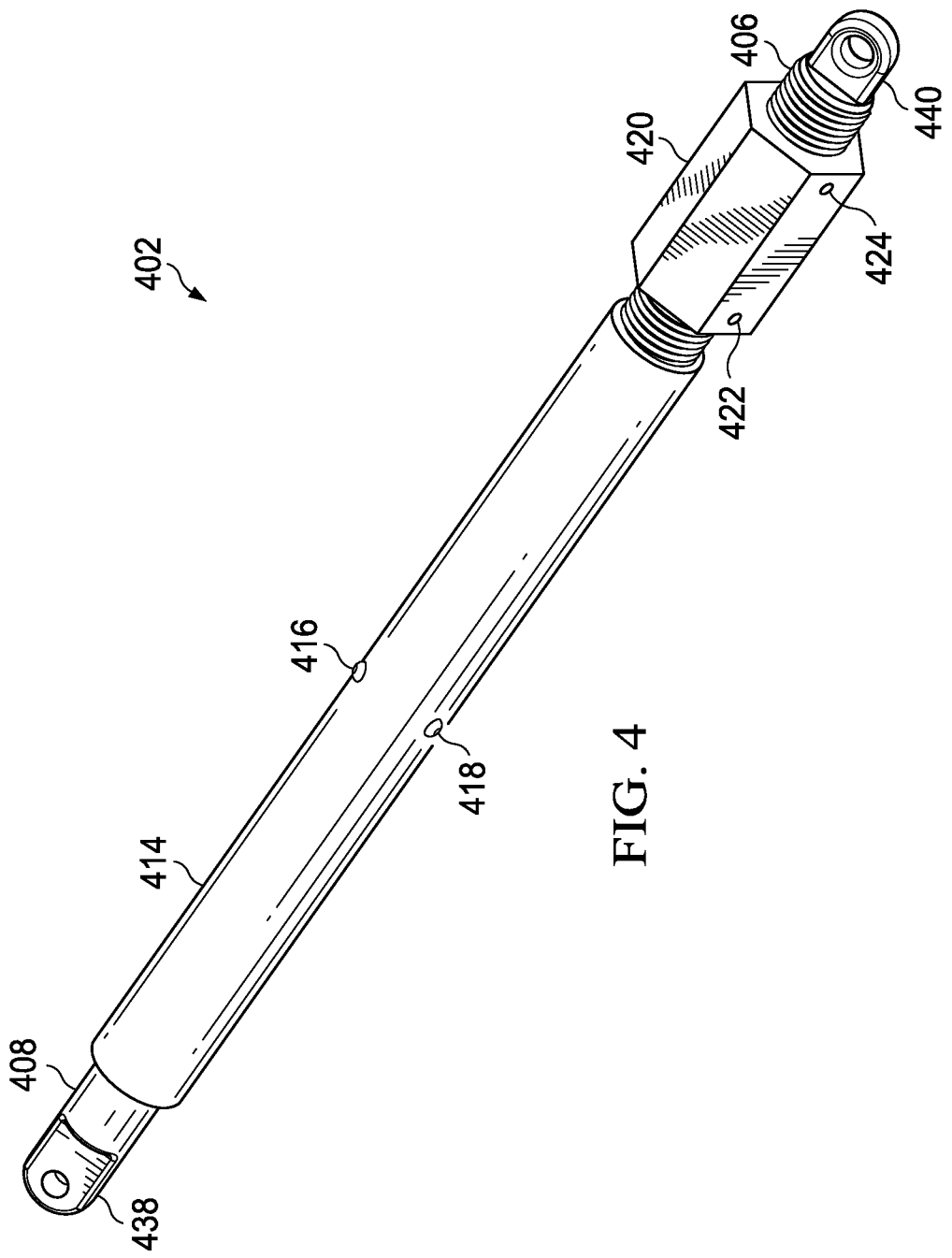
FIG. 4 depicts a rod assembly in accordance with an illustrative embodiment.

FIG. 4 depicts rod assembly 402 in accordance with an illustrative embodiment. Components shown in FIG. 4 through FIG. 11 are indexed to components in FIG. 1 and FIG. 2. Rod assembly 402 shown in FIG. 4 corresponds to rod assembly 102 shown in FIG. 1 and rod assembly 202 shown in FIG. 2. Compression rod 406 shown in FIG. 4 corresponds to first object 106 shown in FIG. 1 and compression rod 206 shown in FIG. 2. Tension rod 408 shown in FIG. 4 corresponds to second object 108 shown in FIG. 1 and tension rod 208 shown in FIG. 2. Housing 414 shown in FIG. 4 corresponds to housing 214 shown in FIG. 2. Screw 416 and screw 418 shown in FIG. 4 correspond to screw 216 and screw 218, respectively, shown in FIG. 2. Coupling nut 420 shown in FIG. 4 corresponds to coupling nut 220 shown in FIG. 2. Pin 422 and pin 424 shown in FIG. 4 correspond to pin 222 and pin 224, respectively, shown in FIG. 2. End 438 and end 440 shown in FIG. 4 correspond to end 238 and end 240, respectively, shown in FIG. 2.

Rod assembly 402 in FIG. 4 is depicted with compression rod 406 and tension rod 408 placed relatively far inside housing 414 of FIG. 4. End 438 is part of tension rod 408 and may attach to clamping device 212 shown in FIG. 2. End 440 is part of compression rod 406 and may also attach to clamping device 212 shown in FIG. 2. In an embodiment, end 438 and end 440 may be clevis fasteners.

Figure 5:
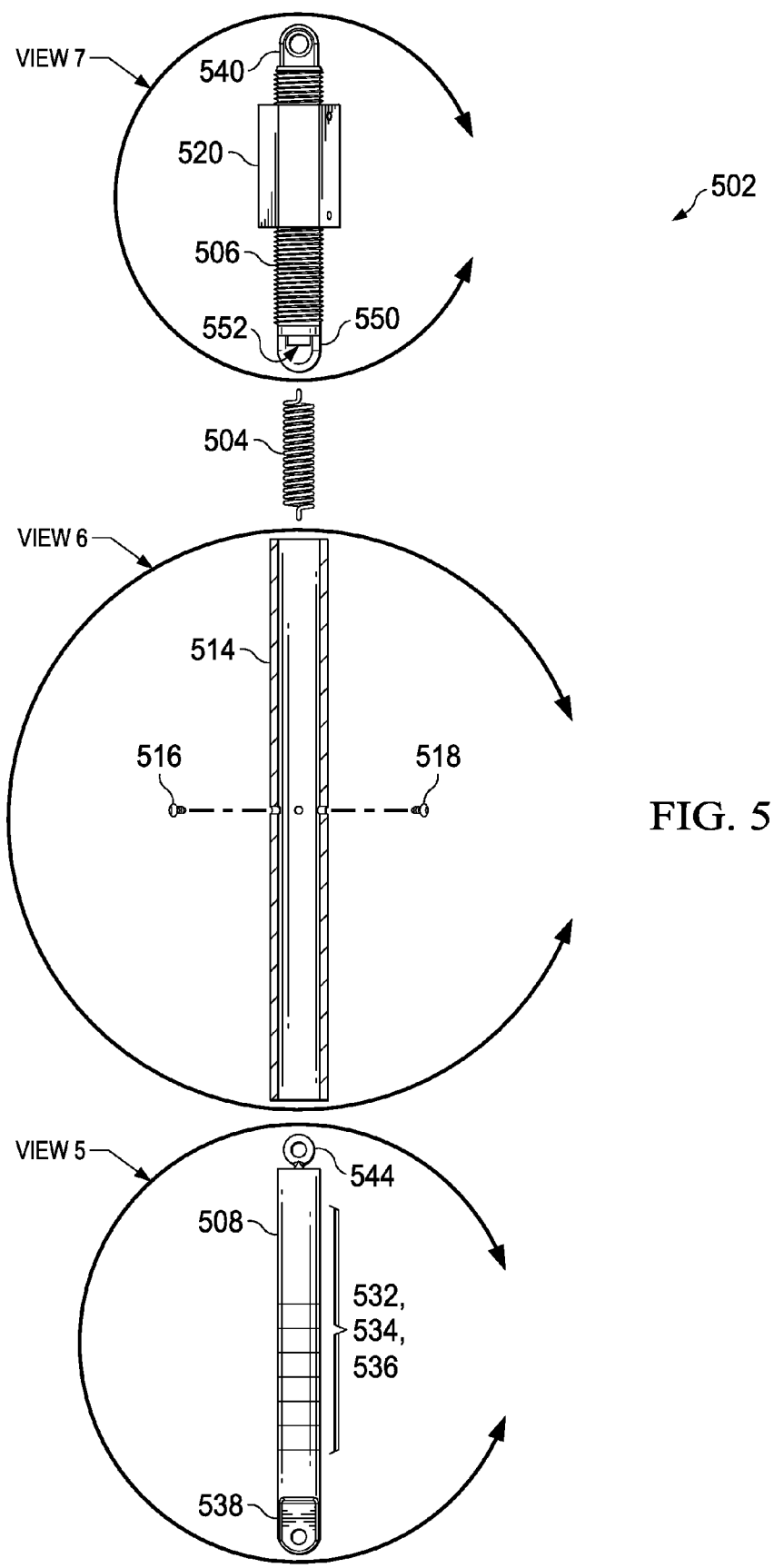
FIG. 5 depicts an exploded rod assembly in accordance with an illustrative embodiment.

FIG. 5 depicts an exploded rod assembly in accordance with an illustrative embodiment, with an exploded view of components of the rod assembly. As with components of FIG. 4, components of FIG. 5 are indexed to components of FIG. 1 and FIG. 2.

Rod assembly 502 shown in FIG. 5 corresponds to rod assembly 102 shown in FIG. 1 and rod assembly 202 shown in FIG. 2. Biasing device 504 shown in FIG. 5 corresponds to biasing device 104 shown in FIG. 1 and biasing device 204 shown in FIG. 2. Compression rod 506 shown in FIG. 5 corresponds to first object 106 shown in FIG. 1 and compression rod 206 shown in FIG. 2. Tension rod 508 shown in FIG. 5 corresponds to second object 108 shown in FIG. 1 and tension rod 208 shown in FIG. 2. Housing 514 shown in FIG. 5 corresponds to housing 214 shown in FIG. 2. Screw 516 and screw 518 shown in FIG. 5 correspond to screw 216 and screw 218, respectively, shown in FIG. 2. Coupling nut 520 shown in FIG. 5 corresponds to coupling nut 220 shown in FIG. 2. Band 532, band 534, and band 536 shown in FIG. 5 correspond to band 232, band 234, and band 236, respectively, shown in FIG. 2. End 538 and end 540 shown in FIG. 5 correspond to end 238 and end 240, respectively, shown in FIG. 2.

FIG. 5 depicts swivel hook 550 attached to end of compression rod 506. Swivel hook 550 attaches to biasing device 504 and swivels so as not to twist biasing device 504 during turning of compression rod 506. FIG. 5 also shows eyelet 544, which attaches to tension rod 508 and attaches to biasing device 504. While discussion herein of FIG. 5 enumerates band 532, band 534, and band 536, FIG. 5 provides a depiction of more than three bands for illustration and discussion purposes. The provision of three bands in FIG. 2 was purely for discussion purposes. In an embodiment, rod assembly 202 may have no bands or one or two bands. In an embodiment, rod assembly 202 may have more than three bands.

FIG. 5 also depicts three semicircles surrounding components of FIG. 5. The semicircles, referred to hereinafter as views, surround components of FIG. 5 to be discussed in association with subsequent figures. A first semicircle denoted as View 5 encompasses tension rod 508 and associated components. A second semicircle denoted as View 6, encompasses housing 514 and associated components. A third semicircle denoted as View 7, encompasses compression rod 506 and associated components.

Figure 6:
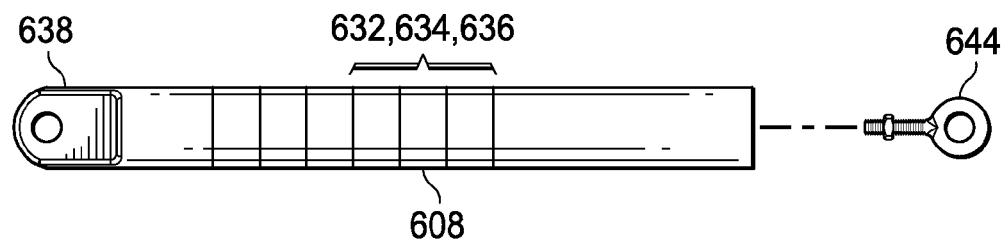
FIG. 6 depicts selected components of a rod assembly in accordance with an illustrative embodiment.

FIG. 6 depicts selected components of a rod assembly in accordance with an illustrative embodiment. FIG. 6 depicts contents of View 5 from FIG. 5 which include tension rod 608, end 638, band 632, band 634, band 636 and eyelet 644. Tension rod 608, end 638, band 632, band 634, band 636 and eyelet 644 correspond to tension rod 508, end 538, band 532, band 534, band 536 and eyelet 544, respectively, depicted in FIG. 5.

Figure 7:
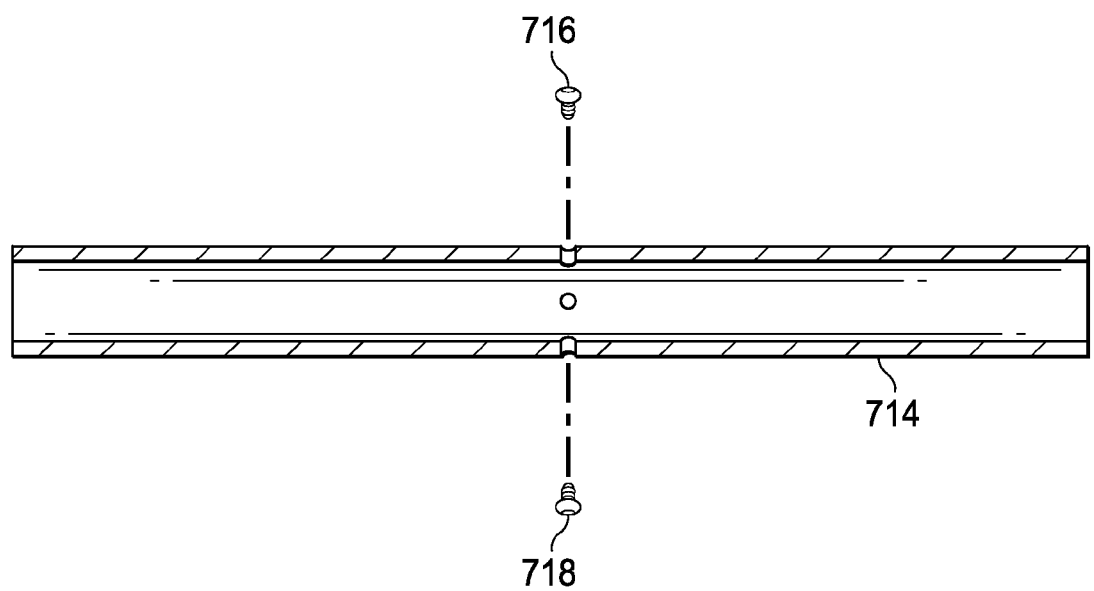
FIG. 7 depicts selected components of a rod assembly in accordance with an illustrative embodiment.

FIG. 7 depicts selected components of a rod assembly in accordance with an illustrative embodiment. FIG. 7 depicts contents of View 6 from FIG. 5 including housing 714, screw 716, and screw 718. Housing 714, screw 716, and screw 718 correspond to housing 514, screw 516, and screw 518, respectively, depicted in FIG. 5.

Figure 8:
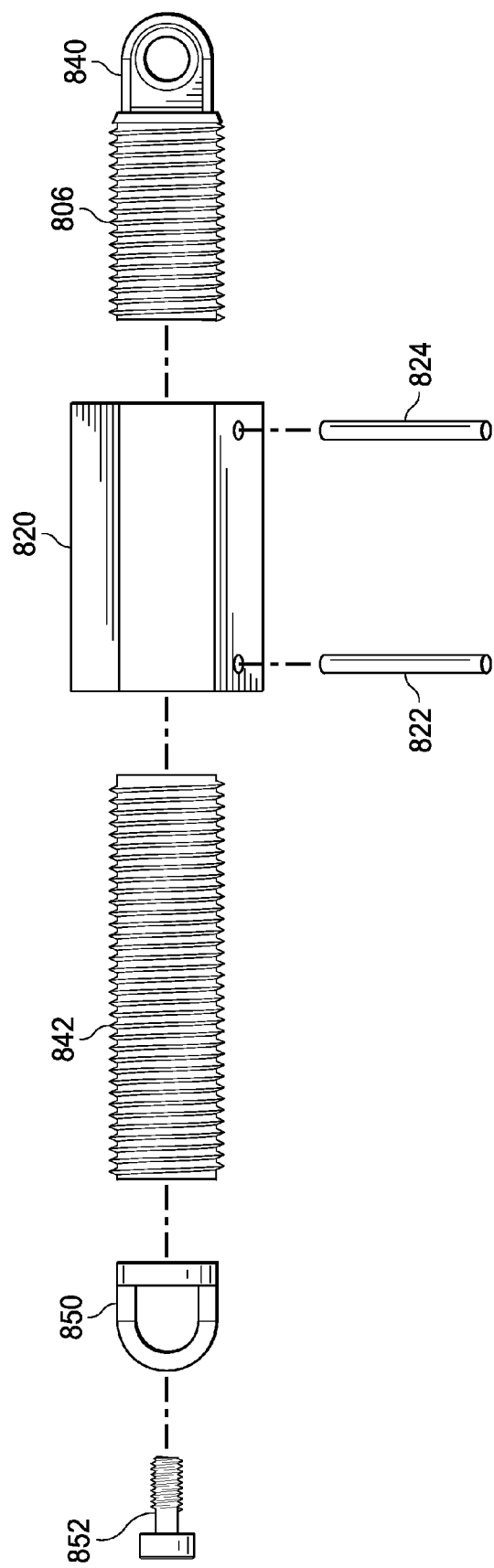
FIG. 8 depicts selected components of a rod assembly in accordance with an illustrative embodiment.

FIG. 8 depicts selected components of a rod assembly in accordance with an illustrative embodiment. FIG. 8 depicts contents of View 7 from FIG. 5 including compression rod 806, coupling nut 820, pin 822, pin 824, end 840, swivel hook 850, and bolt 852. Compression rod 806, coupling nut 820, end 840, swivel hook 850, and bolt 852 of FIG. 8 correspond to compression rod 506, coupling nut 520, end 540, swivel hook 550, and bolt 552, respectively, depicted in FIG. 5. Bolt 852 screws into and affixes swivel hook 850 to end of compression rod 806 that screws into threaded end of housing 514 of FIG. 5. As discussed previously, compression rod 806 may be provided as more than one physical component, as shown in FIG. 8. Secondary compression rod 842 may be a second compression rod when compression rod is more than one physical component.

Figure 9:
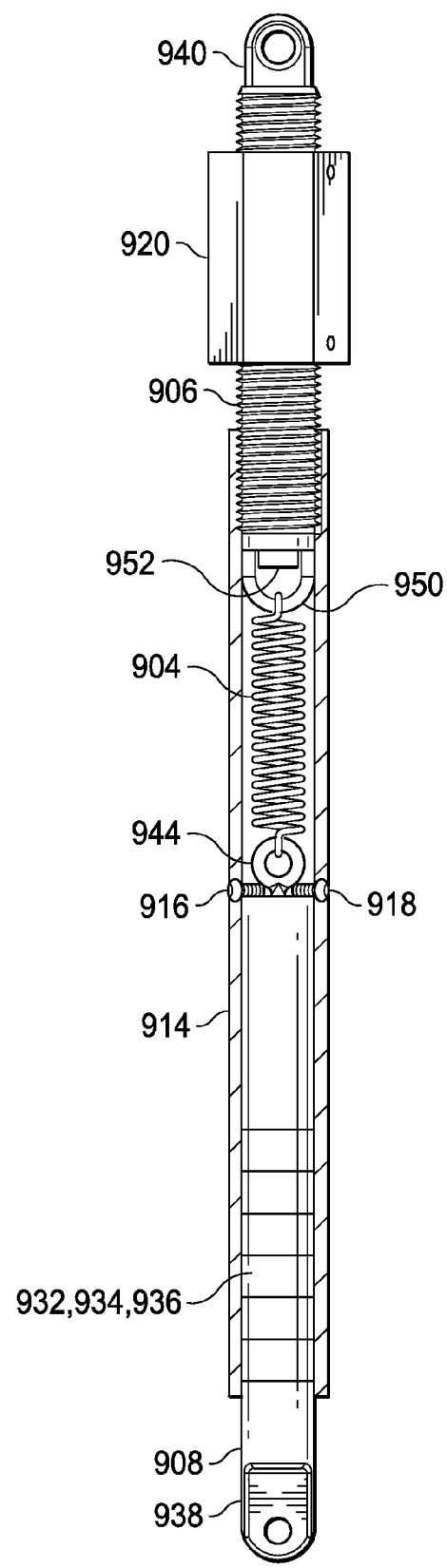
FIG. 9 depicts selected components of a rod assembly in accordance with an illustrative embodiment.

FIG. 9 depicts selected components of a rod assembly in accordance with an illustrative embodiment. In FIG. 9, the interior of housing 914 is made visible. Biasing device 904, compression rod 906, tension rod 908, housing 914, screw 916, and screw 918 shown in FIG. 9 correspond to biasing device 504, compression rod 506, tension rod 508, housing 514, screw 516, and screw 518 shown in FIG. 5. Coupling nut 920, band 932, band 934, band 936, end 938, and end 940 shown in FIG. 9 correspond to coupling nut 520, band 532, band 534, band 536, end 538, and end 540 shown in FIG. 5. Biasing device 904, band 932, band 934, band 936, eyelet 944, swivel hook 950, and bolt 952 are depicted although they are inside housing 914. These components would not be visible unless housing 914 was made from a transparent or translucent material.

Figure 10:
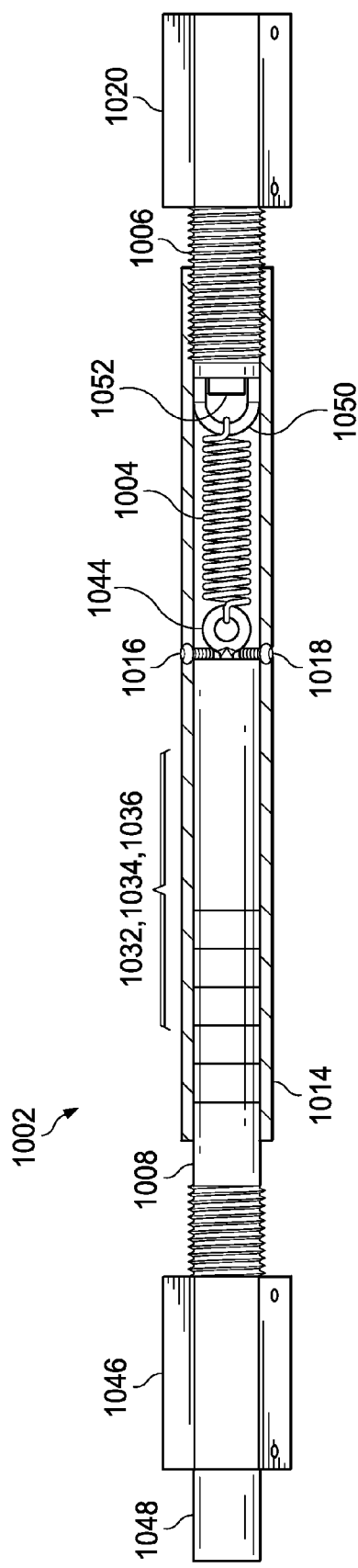
FIG. 10 depicts a rod assembly in accordance with an illustrative embodiment.

FIG. 10 depicts rod assembly 1002 in accordance with an illustrative embodiment. Biasing device 1004, compression rod 1006, tension rod 1008, housing 1014, screw 1016, and screw 1018 shown in FIG. 10 correspond to biasing device 504, compression rod 506, tension rod 508, housing 514, screw 516, and screw 518 shown in FIG. 5. Coupling nut 1020, band 1032, band 1034, and band 1036 shown in FIG. 10 correspond to coupling nut 520, band 532, band 534, and band 536 shown in FIG. 5. Eyelet 1044, swivel hook 1050, and bolt 1052 correspond to eyelet 544, swivel hook 550, and bolt 552 shown in FIG. 5.

In FIG. 10, tension rod 1008, instead of having a tabbed external end as discussed to this point, has a threaded external end. The illustrative embodiments provide for multiple coupling nuts to be deployed. In the embodiment shown in FIG. 10, second coupling nut 1046 screws onto the threaded end of tension rod 1008. Screwing second coupling nut 1046 onto threaded end of tension rod 1008 may permit extension rod 1048 to be screwed into second coupling nut 1046, thus extending overall length of rod assembly 1002. Screwing second coupling nut 1046 onto threaded end of tension rod 1008 may affect use in a device as it allows a different type of coupling.

Figure 11:
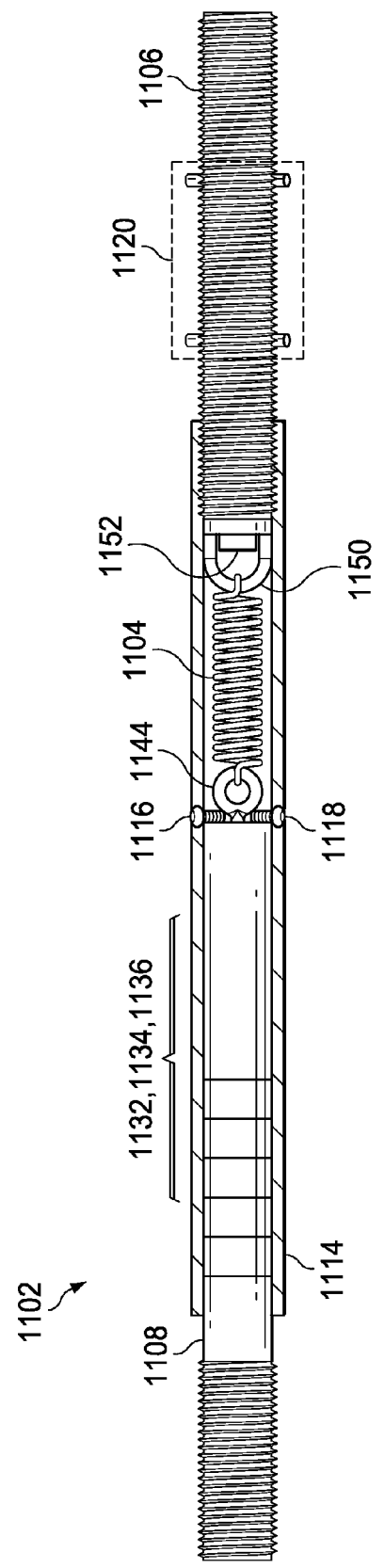
FIG. 11 depicts a rod assembly in accordance with an illustrative embodiment.

FIG. 11 depicts a rod assembly 1102 in accordance with an illustrative embodiment that is similar to the embodiment depicted in FIG. 10. Biasing device 1104, compression rod 1106, tension rod 1108, housing 1114, screw 1116, and screw 1118 shown in FIG. 11 correspond to biasing device 504, compression rod 506, tension rod 508, housing 514, screw 516, and screw 518 shown in FIG. 5. Coupling nut 1120, band 1132, band 1134, band 1136, and end 1138 shown in FIG. 11 correspond to coupling nut 520, band 532, band 534, band 536, and end 538 shown in FIG. 5. Eyelet 1144, swivel hook 1150, and bolt 1152 correspond to eyelet 544, swivel hook 550, and bolt 552 shown in FIG. 5.

Tension rod 1108 in FIG. 11 is depicted with a threaded end. However, a coupling nut similar to coupling nut 1046 in FIG. 10 is not present on tension rod 1108 as in FIG. 10. Rather, coupling nut 1120 is depicted on compression rod 1106 as provided for in previous illustrative embodiments.

FIG. 12 through FIG. 18 depict applications for a rod assembly 1202 in accordance with illustrative embodiments. FIG. 12 through FIG. 18 depict clamping device 1212 that may be used in conjunction with rod assembly 1202. Each of FIG. 12 through FIG. 18 shows clamping device 1212 applying pressure to a square or boxlike object 1238. In an embodiment, object 1238 is equivalent to third object 110 shown in FIG. 1 and object 210 shown in FIG. 2. In an embodiment, object 1238 may be fragile or contain fragile items such that applying sufficient but not excessive pressure to object 1238 is needed to complete a task.

Clamping device 1212 shown in FIG. 12 through FIG. 18 may be identical for discussion purposes herein. References herein to components of clamping device 1212 shown in FIG. 12 apply to components of clamping device 1212 shown in FIG. 13 through FIG. 18. Discussion henceforth regarding clamping device 1212 and its components may be assumed to apply to clamping device 1212 and their components shown in FIG. 13 through FIG. 18.

Figure 12:
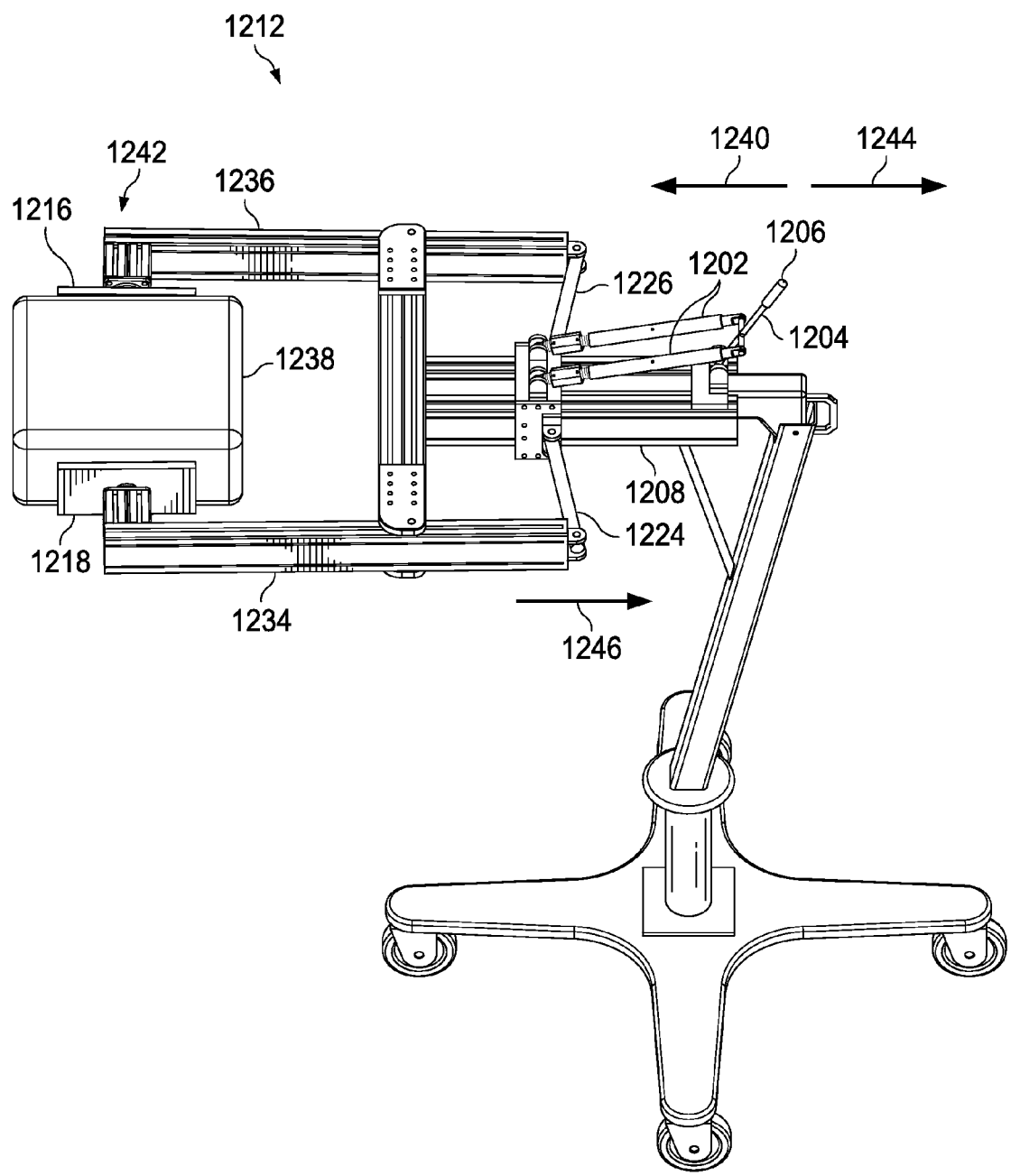
FIG. 12 depicts an application for a rod assembly in accordance with an illustrative embodiment.

Clamping device 1212 may be equipped with lever 1204 with handle 1206. While FIG. 12 shows quantity two of rod assembly 1202 attached to lever 1204, in other embodiments, one rod assembly 1202 or more than two rod assemblies 1202 may be used. Sliding mechanism 1208 controls opening and closing of jaw component 1216 and jaw component 1218 of the clamping device 1212. Sliding mechanism 1208 is connected by rigid, pin-connected rod 1224 and rod 1226 to arm 1234 and arm 1236 that have jaw component 1216 and jaw component 1218.

When lever 1204 is pushed forward 1240, rod assembly 1202 is compressed and jaw component 1216 and jaw component 1218 of the clamping device are opened 1242. When lever 1204 is pulled back 1244 or away from object 1202 being clamped, sliding mechanism 1208 is also pulled back 1246. Pulling lever 1204 action forces jaw component 1216 and jaw component 1218 to clamp object 1238. Tension set for rod assembly 1202 affects pressure on object 1238 by clamping device 1212. A relationship between tension set for rod assembly 1202 and pressure on object 1238 by clamping device 1212 may be illustrated through a discussion of Hooke's Law, $F=-kx$, where F is a force vector, k is a constant, and x is the displacement vector. Given a spring constant for biasing device 204 and appropriately calibrated tension rod 208, a known clamping force may be determined from indicated level of tension shown on tension rod 208 in FIG. 2.

Figure 13:
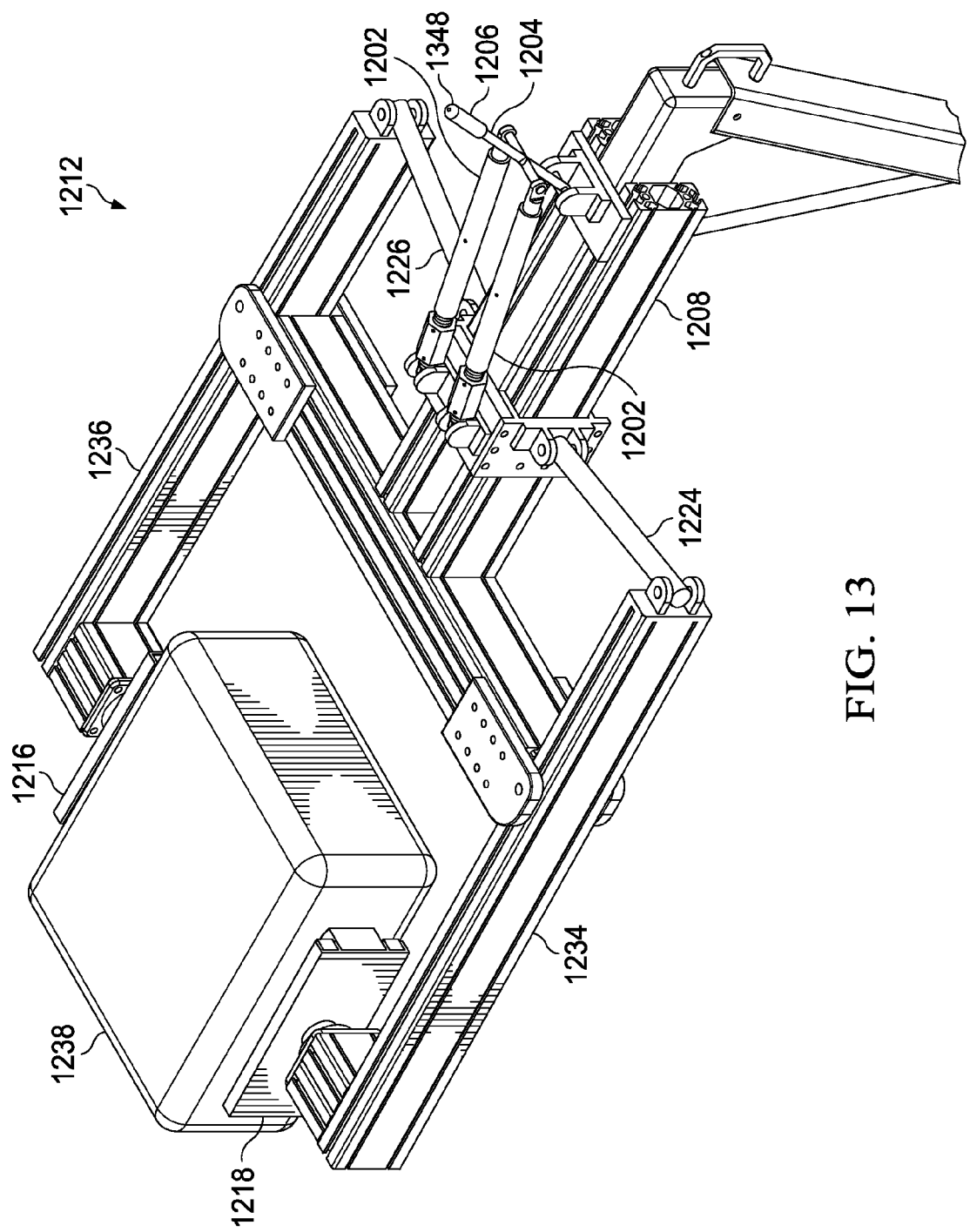
FIG. 13 depicts an application for a rod assembly in accordance with an illustrative embodiment.
Figure 14:
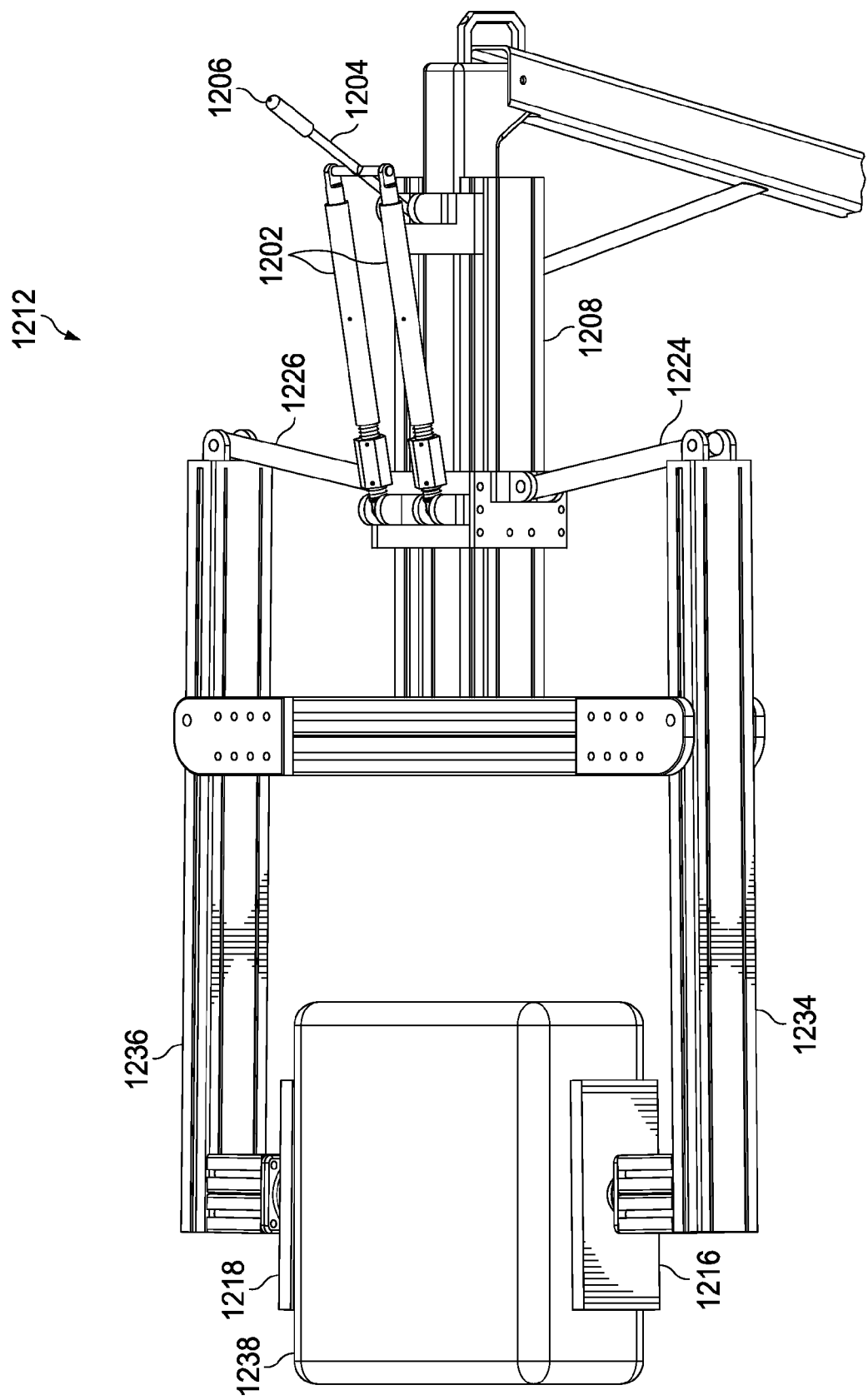
FIG. 14 depicts an application for a rod assembly in accordance with an illustrative embodiment.

FIG. 13 depicts a clamping device 1212 with lever 1204 in an up position 1348 that a user may activate. FIG. 14 depicts an application for a rod assembly 1202 in accordance with an illustrative embodiment. FIG. 14 depicts clamping device 1212 including quantity two of rod assembly 1202 attached. FIG. 14 depicts clamping device 1212 with lever 1204 and handle 1206 presently in an up or forward position. Lever 1204 and handle 1206 presently in the up or forward position indicates that jaw component 1216 and jaw component 1218 are presently exerting tension or in the process of releasing object 1238. FIG. 14 also depicts sliding mechanism 1208, rod 1224, rod 1226, arm 1234, and arm 1236.

Figure 15:
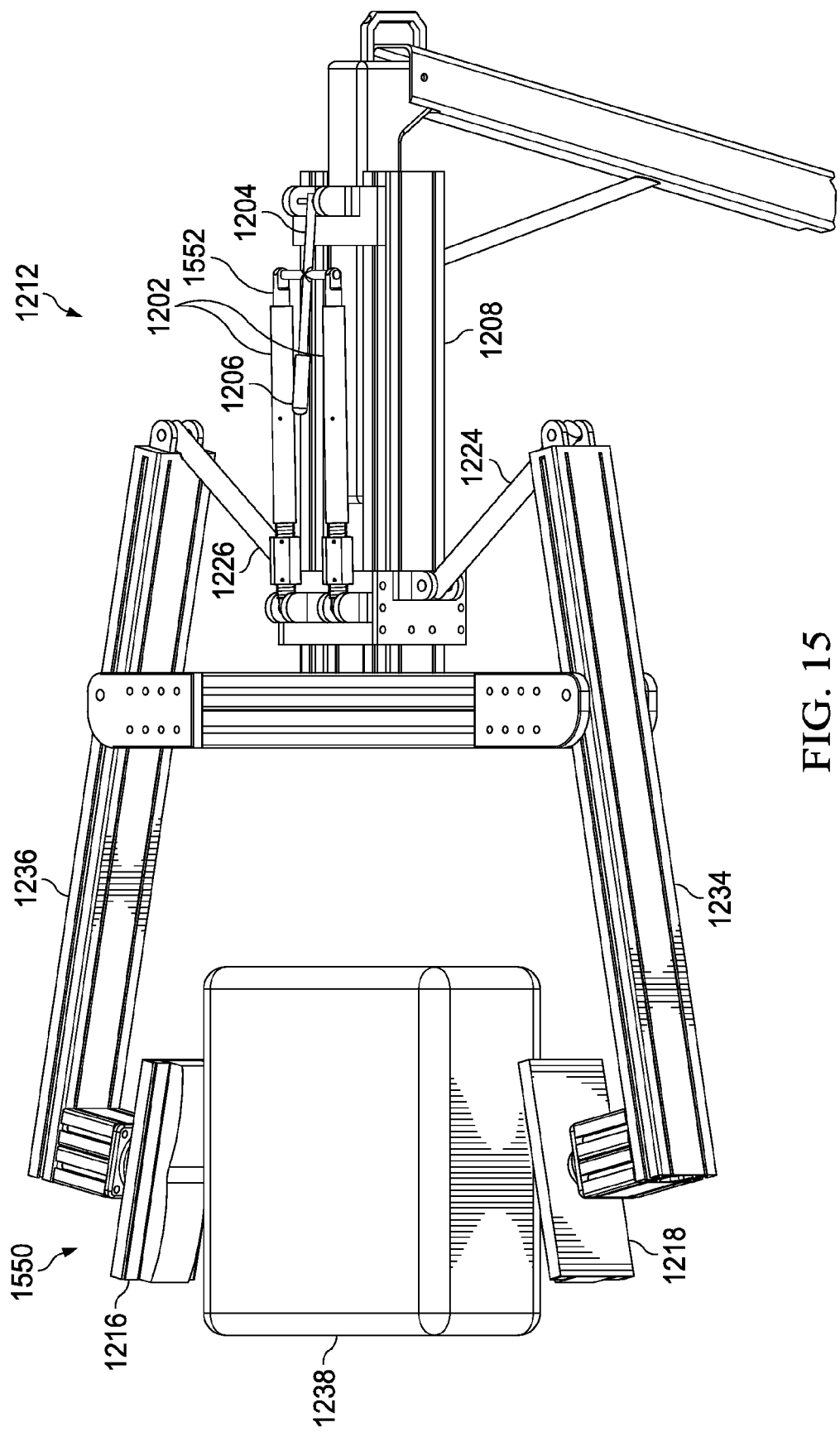
FIG. 15 depicts an application for a rod assembly in accordance with an illustrative embodiment.
Figure 16:
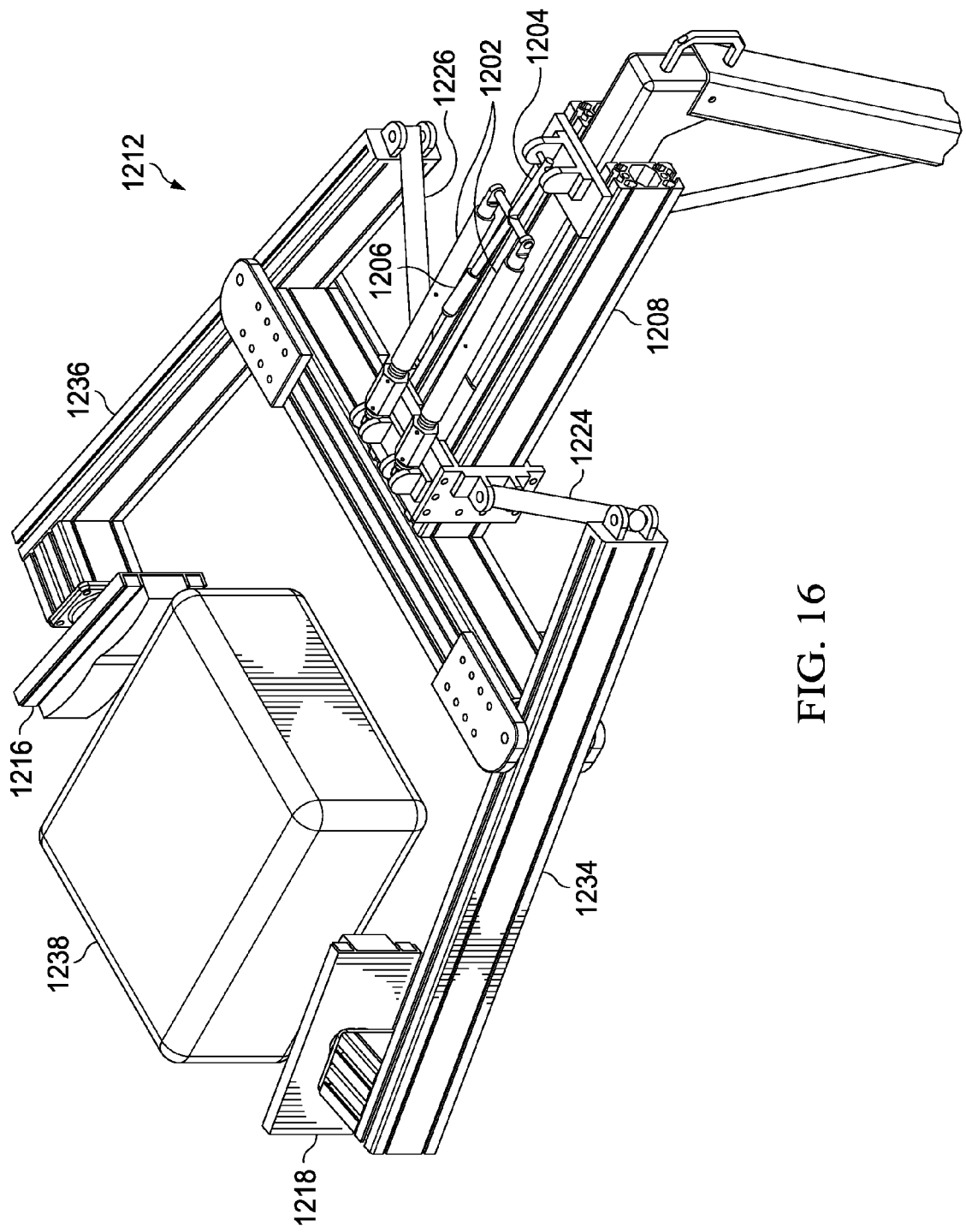
FIG. 16 depicts an application for a rod assembly in accordance with an illustrative embodiment.

FIG. 15 shows clamping device 1212 in an open position 1550 wherein two rod assemblies 1202 are acting in compression 1552 to force jaw component 1216 and jaw component 1218 open 1550. FIG. 16 depicts an application for a rod assembly 1202 in accordance with an illustrative embodiment. FIG. 16 depicts clamping device 1212 including quantity two of rod assembly 1202 attached. FIG. 16 depicts clamping device 1212 with lever 1204 and handle 1206 presently in a fully forward position. Lever 1204 and handle 1206 presently in a fully forward position indicates that jaw component 1216 and jaw component 1218 are presently exerting tension and have released object 1238. FIG. 16 also depicts sliding mechanism 1208, rod 1224, rod 1226, arm 1234, and arm 1236.

Figure 17:
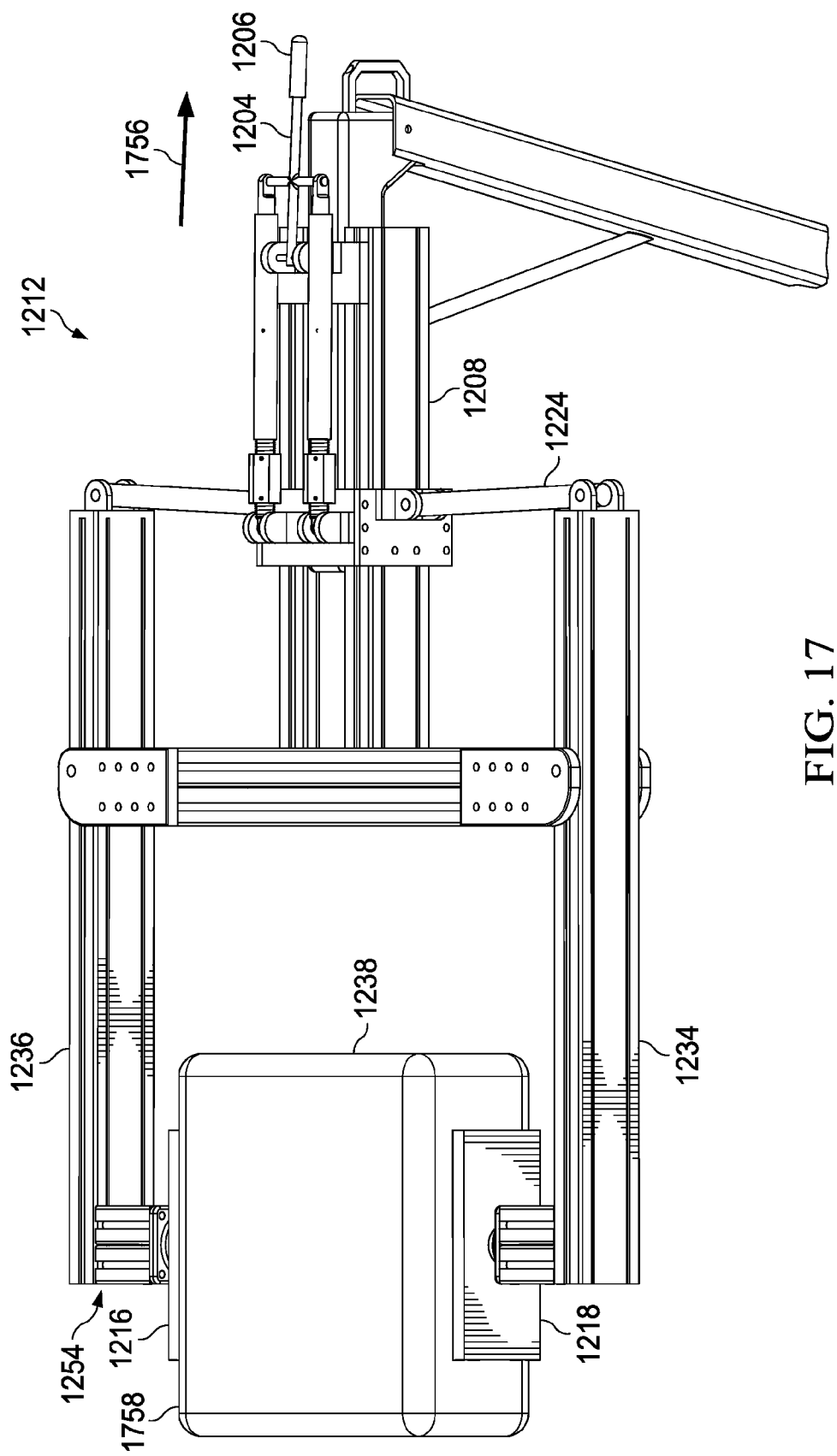
FIG. 17 depicts an application for a rod assembly in accordance with an illustrative embodiment.
Figure 18:
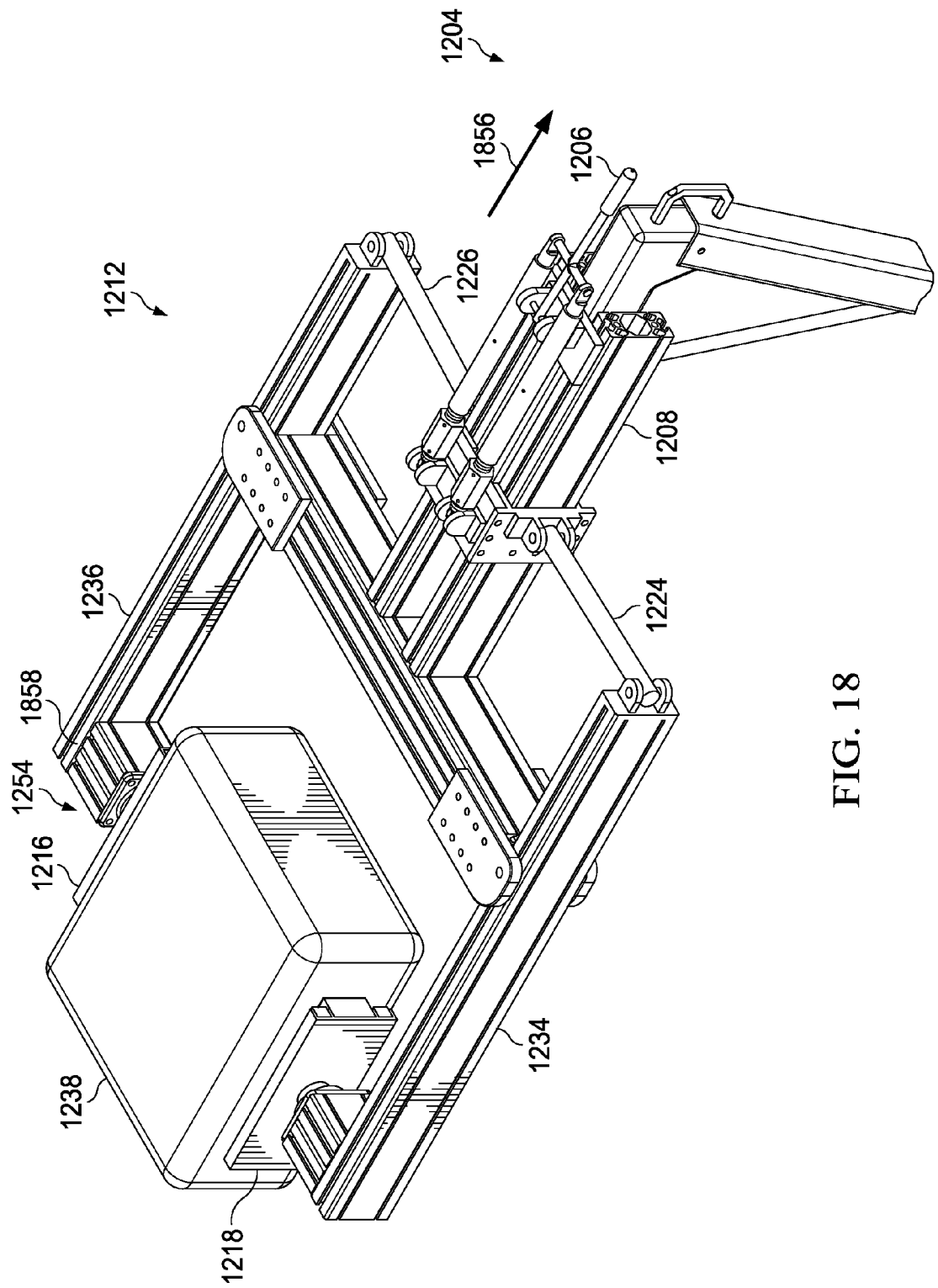
FIG. 18 depicts an application for a rod assembly in accordance with an illustrative embodiment.

FIG. 17 and FIG. 18 shows clamping device 1212 and 1212 in a closed position 1754 and 1854. Handle 1206 is pulled back 1756 and 1856 and jaw components 1216 and 1218 begin to close around object 1238 to be clamped 1758 and 1858. Once jaw component 1216 and jaw component 1218 touch object 1238 on either side of object 1238 or however clamping is effected, biasing device 1204 begins to be extended.

The illustrative embodiments provide for a known clamping force to be calculated based on the spring constant of biasing device 204 and based on the calibration level exhibited on tension rod 208. The illustrative embodiments recognize that biasing device 204 may obey Hooke's law, which states that the force with which biasing device 204 pushes back is linearly proportional to the distance from its equilibrium length. A formula that may apply is $F=-kx$, where x is the displacement vector, defined as the distance and direction biasing device 204 is deformed from its equilibrium length, F is the resulting force vector, defined as the magnitude and direction of the restoring force biasing device 204 exerts, and k is the spring constant of biasing device 204, a constant that depends on the material and construction of biasing device 204.

Figure 19:
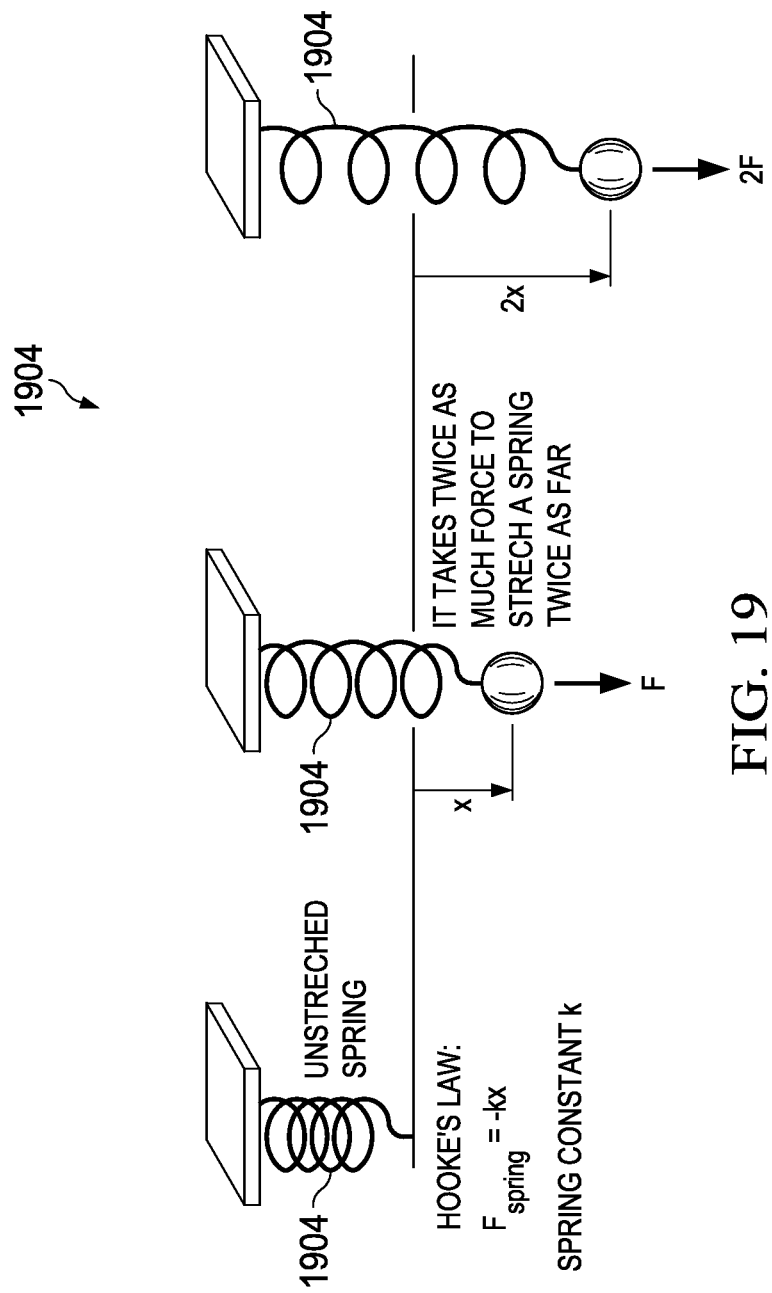
FIG. 19 is an illustration of Hooke's Law.

FIG. 19 is an illustration of Hooke's Law. FIG. 19 depicts biasing device 1904, which in an embodiment is a spring with a spring constant k. In FIG. 19, displacement vector is represented as the variable x. FIG. 19 illustrates that to stretch spring 1904 twice as far as a previous length may require twice the force exerted to achieve stretching to the previous length.

The illustrative embodiments contemplate that the formula described in the preceding paragraph or other formulae or methods may be used to calculate tension applied by a rod assembly in various applications. While the discussion herein has concerned the use of a rod assembly 202 with a clamping device 212, other applications for a rod assembly 202 not limited to clamping or grasping are provided for by the systems and methods taught herein.

FIG. 20 is a flowchart of a method of manufacturing a commercial aircraft. Referring to FIG. 20 and FIG. 21, embodiments of the disclosure may be described in the context of an aircraft manufacturing and service method 2000 as shown in FIG. 20 and an aircraft 2102 as shown in FIG. 21. During pre-production, exemplary method 2000 may include specification and design 2004 of the aircraft 2102 and material procurement 2006. During production, component and subassembly manufacturing 2008 and system integration 2010 of the aircraft 2102 takes place. Thereafter, the aircraft 2102 may go through certification and delivery 2012 in order to be placed in service 2014. While in service by a customer, the aircraft 2102 is scheduled for routine maintenance and service 2016 (which may also include modification, reconfiguration, refurbishment, and so on).

Each of the processes of method 2000 may be performed or carried out by a system integrator, a third party, and/or an operator (e.g., a customer). For the purposes of this description, a system integrator may include without limitation, any number of aircraft manufacturers and major-system subcontractors; a third party may include without limitation, any number of venders, subcontractors, and suppliers; and an operator may be an airline, leasing company, military entity, service organization, and so on.

FIG. 21 is a block diagram of a commercial aircraft. As shown in FIG. 21, the aircraft 2102 produced by exemplary method 2000 may include an airframe 2118 with a plurality of systems 2120 and an interior 2122. Examples of high-level systems 2120 include one or more of a propulsion system 2124, an electrical system 2126, a hydraulic system 2128, and an environmental system 2130. Any number of other systems may be included. Although an aerospace example is shown, the principles of the invention may be applied to other industries, such as the automotive industry.

Apparatus and methods embodied herein may be employed during any one or more of the stages of the production and service method 2000. For example, components or subassemblies corresponding to production process 2008 may be fabricated or manufactured in a manner similar to components or subassemblies produced while the aircraft 2102 is in service. Also, one or more apparatus embodiments, method embodiments, or a combination thereof may be utilized during the production stages 2008 and 2010, for example, by substantially expediting assembly of or reducing the cost of an aircraft 2102. Similarly, one or more of apparatus embodiments, method embodiments, or a combination thereof may be utilized while the aircraft 2102 is in service, for example and without limitation, to maintenance and service 2016.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus with adjustable compression, tension, and extension, comprising:
    a housing component comprising a hollow tube having a first end and a second end, wherein threads are inside the hollow tube at the first end of the housing component,
    a compression rod having a threaded outer surface, a third end, and a fourth end, wherein the compression rod is screwed partially inside the first end of the housing component, wherein the fourth end of the compression rod extends away from housing component, and wherein the fourth end of the compression rod is attached to a device via a first attachment;
    a spring connected to the third end of the compression rod;
    a coupling nut screwed onto the compression rod, the coupling nut disposed between the third end and the fourth end of the compression rod and outside the housing component; and
    a tension rod partially inserted in the second end of the housing component, the tension rod having a fifth end extending away from the housing component and a sixth end connected to the spring opposite the compression rod, wherein the fifth end of the tension rod is attached to the device via a second attachment.

2. The apparatus of claim 1, wherein the device is a clamping device.

3. The apparatus of claim 2, wherein alterations to at least one of compression and tension of the spring promote the clamping device to alter clamping pressure.

4. The apparatus of claim 2, wherein the clamping device comprises a rod connected to the fourth end of the compression rod, a lever connected to the fifth end of the tension rod, an arm connected to the rod, and a clamp connected to the arm; such that moving the lever will cause a force on the tension rod to change and transmit the force via the spring, the compression rod, the rod, and the arm, and thereby will adjust a clamping force the clamp imposes on an object.

5. The apparatus of claim 1, wherein the tension rod further comprises indicia which indicate an amount of force being imposed on the tension rod, the indicia calibrated to a spring constant of the spring.

6. The apparatus of claim 1, further comprising a swivel hook connecting the compression rod to the spring and an eyelet connecting the tension rod to the spring.

7. The apparatus of claim 1 further comprising:
    a threaded hole disposed in the housing component; and
    a screw screwed in the threaded hole, wherein the screw maintains a rigidity of the apparatus.

8. The apparatus of claim 1 further comprising:
    a hole disposed in the coupling nut; and
    a pin disposed in the hole, wherein the pin locks the coupling nut to the compression rod.

9. The apparatus of claim 1, wherein the device comprises:
    the first attachment; and
    the second attachment, configured such that using the device at the second attachment to pull the spring results in a tension of the spring and using the device at the second attachment to push the spring results in a compression of the spring.

10. The apparatus of claim 9, wherein the spring returns to a resting position after the device has been pushed or pulled at the second attachment and wherein the spring is under compression when the spring is in the resting position.

11. The apparatus of claim 1, wherein a position of the coupling nut on the compression rod determines a compression exerted on the spring when the spring is at rest.

12. The apparatus of claim 3, wherein the apparatus is attached to a lever and configured such that pulling the lever in a first direction causes the clamping device to apply clamping pressure.

13. The apparatus of claim 12, configured such that pushing the lever in a second direction causes the clamping device to remove clamping pressure.

14. A method for controlling an amount of force required to retain and release at least one object through clamping and holding, the method comprising:
    attaching a rod assembly to a clamping device, the clamping device comprising jaws for applying a first compression to an object, the clamping device further comprising a handle in which pulling the handle causes the jaws to apply the first compression to the object and in which pushing the handle causes the jaws to release the first compression on the object, wherein the rod assembly comprises:
        a housing component comprising a hollow tube having threads inside the hollow tube at a first end of the housing component and, at a second end of the housing component, the hollow tube has a smooth inner surface, the housing component having a first outer diameter;
        a compression rod having a threaded outer surface, a third end, and a fourth end, wherein the compression rod is screwed partially inside the first end of the housing component and wherein the fourth end of the compression rod extends away from housing component;
        a spring connected to the third end of the compression rod;
        a coupling nut screwed onto the compression rod, the coupling nut disposed between the third end and the fourth end of the compression rod and outside the housing component, and the coupling nut having a second outer diameter greater than the first outer diameter of the housing component; and
        a tension rod partially inserted in the second end of the housing component, the tension rod having a fifth end extending away from the housing component and a sixth end connected to the spring opposite the compression rod, wherein the tension rod further comprises indicia which indicate an amount of force being imposed on the tension rod, the indicia calibrated to a spring constant of the spring, and wherein the tension rod is connected to the handle;
    turning the coupling nut to set a tension of the spring until the tension is exhibited on the indicia, the tension causing a second compression against the object when the handle is pulled; and moving the handle to apply or release compression on the object.

15. The method of claim 14, wherein the indicia are calibrated to a spring constant of the spring.

16. The method of claim 14 further comprising:
   screwing a screw into a threaded hole disposed in the housing component to maintain a rigidity of the rod assembly.

17. The method of claim 14 further comprising:
   inserting a pin in a hole disposed in the coupling nut to lock the coupling nut to the compression rod.

18. An apparatus with adjustable compression, tension, and extension, comprising:
   a housing component comprising a hollow tube having a first end and a second end, wherein threads are inside the hollow tube at the first end of the housing component; a spring inside the housing component;
   a compression rod having a threaded outer surface, a third end, and a fourth end, wherein the compression rod is screwed partially inside the first end of the housing component, wherein the fourth end of the compression rod extends away from housing component, wherein the spring is connected to the third end of the compression rod, and wherein adjustments to positioning of the compression rod relative to the housing component towards the spring places the spring into compression;
   a tension rod partially inserted in the second end of the housing component, the tension rod having a fifth end extending away from the housing component and a sixth end connected to the spring opposite the compression rod, wherein the fifth end of the tension rod is attached to a clamping device, and wherein the clamping device pulling the tension rod away from the compression rod removes the spring from compression and places the spring into tension;
   wherein the tension rod further comprises indicia which indicate an amount of force being imposed on the tension rod, the indicia calibrated to a spring constant of the spring; and a clamping force of the clamping device is calculated based on a spring constant of the spring and the amount of force indicated by the indicia.

19. A method for controlling an amount of force required to retain and release at least one object through clamping and holding, the method comprising:
   attaching a rod assembly to a clamping device, the clamping device comprising jaws for applying a first compression to an object, the clamping device further comprising a handle in which pulling the handle causes the jaws to apply the first compression to the object and in which pushing the handle causes the jaws to release the first compression on the object, wherein the rod assembly comprises:
   a housing component comprising a hollow tube having threads inside the hollow tube at a first end of the housing component and, at a second end of the housing component, the hollow tube has a smooth inner surface;
   a compression rod having a threaded outer surface, a third end, and a fourth end, wherein the compression rod is screwed partially inside the first end of the housing component and wherein the fourth end of the compression rod extends away from housing component;
   a spring connected to the third end of the compression rod;
   a coupling nut screwed onto the compression rod, the coupling nut disposed between the third end and the fourth end of the compression rod and outside the housing component; and
   a tension rod partially inserted in the second end of the housing component, the tension rod having a fifth end extending away from the housing component and a sixth end connected to the spring opposite the compression rod, wherein the tension rod further comprises indicia which indicate an amount of force being imposed on the tension rod, the indicia calibrated to a spring constant of the spring, and wherein the tension rod is connected to the handle; and
   moving the handle to apply or release compression on the object.

20. The method of claim 19, further comprising:
   turning the coupling nut in a first direction to increase a level of compression on the spring and decrease a length of the rod assembly.

21. The method of claim 20, further comprising:
   turning the coupling nut in a second direction to decrease the level of compression on the spring and increase the length of the rod assembly.

22. The method of claim 19, further comprising:
   determining a level of compression on the object based on a spring constant of the spring and the amount of force indicated by the indicia.

* * * * *